(12) United States Patent
Wang et al.

(10) Patent No.: US 12,206,138 B2
(45) Date of Patent: Jan. 21, 2025

(54) BUS MEMBER, BATTERY AND POWER CONSUMPTION DEVICE

(71) Applicant: CONTEMPORARY AMPEREX TECHNOLOGY (HONG KONG) LIMITED, Hong Kong (CN)

(72) Inventors: Xuehui Wang, Ningde (CN); Lu Hu, Ningde (CN); Xiaobo Chen, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 506 days.

(21) Appl. No.: 17/559,581

(22) Filed: Dec. 22, 2021

(65) Prior Publication Data
US 2022/0328945 A1 Oct. 13, 2022

Related U.S. Application Data

(63) Continuation of application No. PCT/CN2021/084736, filed on Mar. 31, 2021.

(51) Int. Cl.
*H01M 50/583* (2021.01)
*H01M 50/505* (2021.01)
*H02J 7/00* (2006.01)

(52) U.S. Cl.
CPC ....... *H01M 50/583* (2021.01); *H01M 50/505* (2021.01); *H02J 7/00304* (2020.01); *H01M 2220/20* (2013.01)

(58) Field of Classification Search
CPC .......................... H01M 50/574; H01M 50/583
See application file for complete search history.

(56) References Cited

U.S. PATENT DOCUMENTS 11,056,748 B2   7/2021  Zhu et al.
11,271,271 B2 *  3/2022  Son ...................... H01M 50/296
(Continued)

FOREIGN PATENT DOCUMENTS

CN   201556664 U   8/2010
CN   201927667 U   8/2011
(Continued)

OTHER PUBLICATIONS

Machine translation of CN107305938 (no date) (Year: 0000).*
(Continued)

*Primary Examiner* — Amanda C. Walke
(74) *Attorney, Agent, or Firm* — Scully, Scott, Murphy & Presser, P.C.

(57) ABSTRACT

The present application provides a bus member, a battery and a power consumption device, and relates to the technical field of batteries. The bus member includes a first connection portion configured to be connected to a first electrode terminal of a first battery cell; a second connection portion configured to be connected to a second electrode terminal of a second battery cell; and a plurality of fusing portions, one end of each fusing portion being connected to the first connection portion, and the other end being connected to the second connection portion; where an overcurrent cross-sectional area corresponding to one of the plurality of fusing portions with a maximum is expressed as $S_{max}$, and with a minimum is expressed as $S_{min}$, $S_{min}$ and $S_{max}$ satisfy: $0.3 \leq S_{min}/S_{max} \leq 1$ and $0.3 \leq S_{min}/S_{max} \leq 1$, thus avoiding accumulation of arc energy of the fusing portions due to a long-duration short circuit.

18 Claims, 8 Drawing Sheets

(56) References Cited

U.S. PATENT DOCUMENTS

| | | | |
|---|---|---|---|
| 11,658,367 B2 * | 5/2023 | Ryu | H01M 50/50 429/163 |
| 2014/0315051 A1 | 10/2014 | Han et al. | |
| 2020/0083512 A1 | 3/2020 | Son et al. | |
| 2020/0127252 A1 | 4/2020 | Zhu et al. | |
| 2021/0135318 A1 | 5/2021 | Wen et al. | |
| 2022/0140444 A1 | 5/2022 | Son et al. | |

FOREIGN PATENT DOCUMENTS

| | | | | |
|---|---|---|---|---|
| CN | 104134774 | A | | 11/2014 |
| CN | 107305938 | A | | 10/2017 |
| CN | 107507952 | A | | 12/2017 |
| CN | 110890508 | A | | 3/2020 |
| CN | 211654935 | U | | 10/2020 |
| CN | 211789255 | U | * | 10/2020 |
| EP | 2793291 | A2 | | 10/2014 |
| EP | 3565029 | A1 | | 11/2019 |
| IN | 209104250 | U | | 7/2019 |
| JP | 2011253679 | A | | 12/2011 |
| JP | 2013196932 | A | | 9/2013 |
| JP | 2017157334 | A | | 9/2017 |
| KR | 20130121423 | A | | 11/2013 |
| KR | 20190112575 | A | | 10/2019 |
| KR | 20200029871 | A | | 3/2020 |
| WO | 2017208804 | A1 | | 12/2017 |
| WO | 2018196506 | A1 | | 11/2018 |
| WO | 2019069837 | A1 | | 4/2019 |
| WO | WO-2019190028 | A1 | * | 10/2019 ............ H01M 50/20 |
| WO | WO-2019244402 | A1 | * | 12/2019 .......... H01M 50/204 |
| WO | 2020103716 | A1 | | 5/2020 |
| WO | WO-2021071113 | A1 | * | 4/2021 ............ H01M 50/20 |

OTHER PUBLICATIONS

Notice of Reasons for Refusal dated Jun. 26, 2023 received in Japanese Patent Application No. JP 2021-571440.

Notice of First Office Action dated Jul. 11, 2023 received in Chinese Patent Application No. CN 202180003047.1.

Extended European Search Report dated Jul. 21, 2022 received in European Patent Application No. EP 21786311.7.

* cited by examiner

BUS MEMBER, BATTERY AND POWER CONSUMPTION DEVICE

CROSS-REFERENCE TO RELATED APPLICATIONS

This application is a continuation of International Application No. PCT/CN2021/084736, filed on Mar. 31, 2021, the disclosure of which is hereby incorporated by reference in its entirety.

FIELD OF TECHNOLOGY

The present application relates to the technical field of batteries, in particular to a bus member, a battery and a power consumption device.

BACKGROUND

Lithium-ion batteries have established dominance of secondary batteries on account of their outstanding advantages including but not limited to high energy density and good cycle performance. Besides, they are widely used in portable electrical appliances, hybrid electric vehicles, mobile phones, spacecraft and other fields. As one main concern of users, their safety is also one of dominant factors restricting their development. Therefore, how to improve their safety performance has become an urgent problem to be solved in the field of batteries.

SUMMARY

Embodiments of the present application provide a bus member, a battery and a power consumption device for improving safety performance of a battery.

In a first aspect, the embodiment of the present application provides the bus member. The bus member includes a first connection portion configured to be connected to a first electrode terminal of a first battery cell; a second connection portion configured to be connected to a second electrode terminal of a second battery cell; and a plurality of fusing portions, one end of each fusing portion being connected to the first connection portion, and the other end of each fusing portion being connected to the second connection portion; where an overcurrent cross-sectional area corresponding to one of the plurality of fusing portions with a maximum overcurrent cross-sectional area is expressed as Smax, and an overcurrent cross-sectional area corresponding to one of the plurality of fusing portions with a minimum overcurrent cross-sectional area is expressed as Smin, and Smin and Smax satisfy the following relational expression: $0.3 \leq Smin/Smax \leq 1$.

In the technical solution above, by arranging the plurality of fusing portions on the bus member, the minimum overcurrent cross-sectional area Smin and the maximum overcurrent cross-sectional area Smax of all the fusing portions satisfy $0.3 \leq Smin/Smax \leq 1$, such that when a current flowing through the bus member exceeds a threshold, a time difference between fusing start and fusing end of all the fusing portions is small, that is, fusing time of the bus member is short, thus shortening duration of short circuits of the first battery cell and the second battery cell, avoiding accumulation of arc energy of the fusing portions during fusing due to a long-duration short circuit, and reducing arc damage caused during fusing. The plurality of fusing portions are provided, and may also enhance heat dissipation performance of the bus member in an overcurrent process. When a portion of the fusing portion mechanically breaks accidentally, the other unbroken fusing portion may still guarantee normal operation of the bus member.

In some embodiments of the first aspect, Smin and Smax satisfy the following relational expression: $0.8 \leq Smin/Smax < 1$.

In the above technical solution, the smallest fusing time difference is achieved when the ratio of Smin/Smax falls within 0.8-1, which may further reduce the time difference between the fusing start and the fusing end of all the fusing portions, that is, shorten the fusing time of the bus member, thus further shortening duration of short circuits, effectively avoiding accumulation of arc energy of the fusing portions during fusing due to the long-duration short circuit, and reducing arc damage caused during fusing.

In some embodiments of the first aspect, the sum of the overcurrent cross-sectional areas of the plurality of fusing portions is expressed as Stotal, where Smin and Stotal satisfy the following relational expression: $0.2 \leq Smin/Stotal$; and Smax and Stotal satisfy the following relational expression: $Smin/Stotal \leq 0.6$.

In the above technical solution, by limiting the ratio between the minimum overcurrent area Smin and the sum of the overcurrent cross-sectional areas Stotal of all the fusing portions to be greater than or equal to 0.2 and the ratio between the maximum overcurrent cross-sectional area Smax and the sum of the overcurrent cross-sectional areas Stotal of all the fusing portions to be less than or equal to 0.6, the fusing time of the bus member may be further optimized, and the first battery cell and the second battery cell may be prevented from being short-circuited for a long time.

In some embodiments of the first aspect, overcurrent cross-sectional areas of at least two fusing portions in the plurality of fusing portions are unequal.

In the above technical solution, under the condition that the sum of the overcurrent cross-sectional areas of all the fusing portions is fixed, overcurrent cross-sectional areas of at least two fusing portions are different, such that the minimum fusing time difference of the bus member is achieved, the fusing time of the bus member is further optimized, and the first battery cell and the second battery cell may be prevented from being short-circuited for a long time.

In some embodiments of the first aspect, there are at least three fusing portions, the at least three fusing portions are arranged side by side in a width direction of the bus member, and the overcurrent cross-sectional areas of the at least three fusing portions are sequentially reduced from two sides to a middle of the bus member in the width direction.

In the above technical solution, the two sides, in the width direction, of the bus member, subjected to external force, bear relatively-large torque, so the overcurrent cross-sectional areas of the fusing portions are sequentially reduced from the two sides to the middle of the bus member in the width direction, mechanical strength of the bus member is enhanced, and the two sides of the bus member in the width direction may bear the relatively-large torque.

In some embodiments of the first aspect, the overcurrent cross-sectional area of the fusing portion is 1.5 times greater than a thickness of the fusing portion.

In the above technical solution, since the bus member is stamp formed, the bus member may be guaranteed to be effectively stamped with a sufficient width. Therefore, if the overcurrent cross-sectional area of the fusing portion is 1.5 times greater than the thickness thereof, the width of the fusing portion is 1.5 times greater than the thickness thereof, so as to enhance manufacturability of the bus member.

In some embodiments of the first aspect, at least one of the fusing portions is provided with a bent portion, the bent portion being configured to absorb stress in the width direction of the bus member.

In the above technical solution, the bent portion is arranged on the fusing portion, such that the bent portion may absorb the stress in the width direction of the bus member and play a certain role in protecting the bus member and the battery cell.

In some embodiments of the first aspect, a gap is formed among at least one side, in the width direction of the bus member, of the plurality of fusing portions, the first connection portion and the second connection portion.

In the above technical solution, the gap is provided for facilitating placing of a protective cover, and the gap may make room for other structures of a bus member without a protective cover, and may make the fusing portion be at a certain distance from an inner wall of a box of a battery as well, so as to prevent a high temperature generated during fusing of the fusing portion from damaging the box.

In some embodiments of the first aspect, a first gap is formed among one side in the width direction of the bus member, the first connection portion and the second connection portion, and a second gap is formed among the other side in the width direction of the bus member, the first connection portion and the second connection portion; and the first gap and the second gap have different depths in the width direction of the bus member.

In the above technical solution, the first gap and the second gap have the different depths, and when the relatively deep gap faces an inner wall, closest to the bus member, of the box of the battery, the high temperature generated during fusing of the fusing portion may be prevented from damaging the box.

In some embodiments of the first aspect, the bus member further includes a protective cover, the protective cover being configured to cover the plurality of fusing portions, so as to protect the plurality of fusing portions.

In the above technical solution, the protective cover may not only protect the fusing portion and avoid mechanical breakage caused by deformation of the box, change of a distance between the first battery cell and the second battery cell, etc., but reduce damage of the high temperature generated during fusing of the fusing portion to the box, the first battery cell and the second battery cell, so as to reduce arc hazards caused by fusing of the fusing portion. The protective cover may also enhance structural strength of the bus member.

In a second aspect, the embodiment of the present application provides the battery. The battery includes a first battery cell having a first electrode terminal, a second battery cell having a second electrode terminal, and the bus member provided according to any embodiment of the first aspect, where the first connection portion is connected to the first electrode terminal, and the second connection portion is connected to the second electrode terminal.

In the technical solution above, by arranging the plurality of fusing portions on the bus member of the battery, the minimum overcurrent cross-sectional area Smin and the maximum overcurrent cross-sectional area Smax of all the fusing portions satisfy $0.3 \leq Smin/Smax \leq 1$, such that when a current flowing through the bus member exceeds a threshold, a time difference between fusing start and fusing end of all the fusing portions is small, that is, fusing time of the bus member is short, thus shortening duration of short circuits of the first battery cell and the second battery cell, avoiding accumulation of arc energy of the fusing portions during fusing due to a long-duration short circuit, reducing arc damage caused during fusing and further improving the safety performance of the battery.

In a third aspect, the embodiment of the present application provides the power consumption device. The power consumption device includes the battery provided in the embodiment of the second aspect, and the battery is used for providing electrical energy.

In the above technical solution, when the battery is short-circuited, fusing time of the bus member of the battery is relatively short, thus avoiding accumulation of arc energy of the fusing portions during fusing due to a long-duration short circuit, reducing arc damage caused during fusing, and further improving the safety performance of the battery and electricity safety of the power consumption device.

BRIEF DESCRIPTION OF THE DRAWINGS

To describe the technical solutions in the embodiments of the present application more clearly, the following briefly describes the accompanying drawings required in the embodiments of the present application. Apparently, the accompanying drawings in the following descriptions show merely some embodiments of the present disclosure, and a person of ordinary skill in the art can still derive other accompanying drawings from these accompanying drawings without creative efforts.

Figure 1:
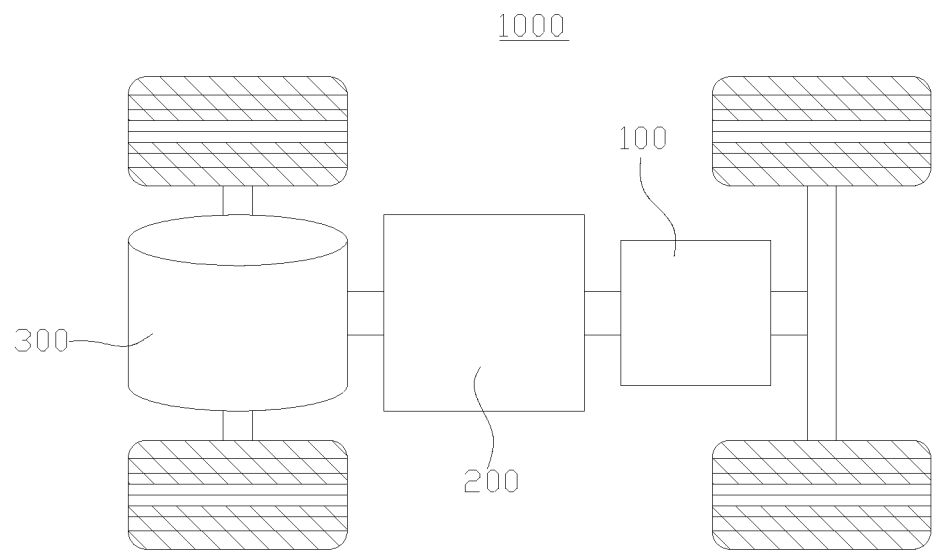
FIG. 1 is a structural schematic diagram of a vehicle provided by some embodiments of the present application.

Reference numerals: 1000—vehicle; 100—battery; 10—box; 11—first box portion; 12—second box portion; 20—battery cell; 21—case; 22—end cover assembly; 221—cover; 222—first electrode terminal; 223—second electrode terminal; 23—electrode assembly; 231—positive tab; 232—negative tab; 24—first battery cell; 25—second battery cell; 30—bus member; 31—first connection portion; 311—first recess; 312—second surface; 313—fifth surface; 32—second connection portion; 321—second recess; 322—third surface; 323—sixth surface; 33—fusing portion; 331—first fusing portion; 3311—first surface; 332—second fusing portion; 333—third fusing portion; 334—fourth fusing portion; 3341—fourth surface; 335—bent portion; 34—first gap; 35—second gap; 36—protective cover; 200—controller; 300—motor; X-width direction; Y-direction from a first connection portion to a second connection portion; and Z-thickness direction.

DETAILED DESCRIPTION OF THE EMBODIMENTS

The following further describes the present application in detail with reference to accompanying drawings and in conjunction with particular embodiments. The following detailed description of the embodiments and the accompanying drawings are used to illustrate principles of the present application, rather than limit the scope of the present application, that is, the present application is not limited to the described embodiments.

In the description of the present application, it should be noted that, unless otherwise specified, "a plurality of" means two or more, the orientation or positional relationships indicated by the terms "up", "down", "left", "right", "inside", "outside", etc. are merely for facilitating the description of the present application and simplifying the description, rather than indicating or implying that an apparatus or an element referred to must have a particular orientation or be constructed and operated in a particular orientation, and therefore will not be interpreted as limiting the present application. In addition, the terms "first", "second", "third", etc. are merely used for describing purposes and may not be understood as indicating or implying relative importance. "Vertical" is not strictly vertical, but within an allowable range of errors. "Parallel" is not strictly parallel, but within an allowable range of errors.

Orientation words in the following description are all directions shown in the figures, and do not limit a specific structure of the present application. In the description of the present application, it should be noted that, unless otherwise explicitly specified and defined, the terms "mounting", "connecting", and "connection" should be understood in a broad sense, for example, they may be a fixed connection, a detachable connection, or an integrated connection; and may be a direct connection, or an indirect connection via an intermediate medium. For those of ordinary skill in the art, the specific meaning of the above terms in the present application could be understood according to specific circumstances.

The term "a plurality of" in the present application means two or more.

In the present application, battery cells may include a lithium ion secondary battery, a lithium ion primary battery, a lithium-sulfur battery, a sodium lithium-ion battery, a sodium ion battery or a magnesium ion battery, etc., which is not limited by the embodiments of the present application. The battery cell may be cylindrical, flat, cuboid or other shapes, which is not limited by the embodiments of the present application. Generally, the battery cells are divided into three types according to the packaging mode: cylindrical battery cells, square battery cells and pouch battery cells, which is not limited by the embodiments of the present application.

The battery mentioned in the embodiment of the present application refers to a single physical module which includes a plurality of battery cells and therefore provides a higher voltage and capacity. For example, the battery mentioned in the present application may include a battery module or a battery pack, etc. Generally, the battery includes a box for packaging the plurality of battery cells. The box may prevent liquid or other foreign matter from affecting charging or discharging of the battery cell.

The battery cell includes an electrode assembly and an electrolyte, where the electrode assembly consists of a positive plate, a negative plate and a separator film. The battery cell works mainly depending on movement of metal ions between the positive plate and the negative plate. The positive plate includes a positive current collector and a positive active material layer, the positive active material layer coating a surface of the positive current collector, a positive current collector not coated with the positive active material layer protrudes out of the positive current collector coated with the positive active material layer, and the positive current collector not coated with the positive active material layer serves as a positive tab. A lithium ion battery is taken as an example, a positive current collector may be made from aluminum, and the positive active material may be lithium cobalt oxide, lithium iron phosphate, ternary lithium or lithium manganate, etc. The negative plate includes a negative current collector and a negative active material layer, the negative active material layer coating a surface of the negative current collector, a negative current collector not coated with the negative active material layer protrudes from the negative current collector coated with the negative active material layer, and the negative current collector not coated with the negative active material layer serves as a negative tab. The negative current collector may be made from copper, and the negative active material may be carbon, silicon, etc. In order to guarantee fusing does not occur during large current flow, a plurality of positive tabs are stacked together, and a plurality of negative tabs are stacked together. The separator film may be made from polypropylene (PP), polyethylene (PE), etc. In addition, the electrode assembly may be in a wound structure or a laminated structure, which is not limited in the embodiments of the present application.

For development of battery technology, various design factors should be considered at the same time, such as energy density, cycle life, discharge capacity, charge-discharge rates and other performance parameters. In addition, safety of the battery needs to be further considered.

For a battery including a plurality of cells, a main safety problem comes from a short circuit between the battery cells. When there is a short circuit between battery cells, a current between battery cells may increase in a relatively short time, and a bus member electrically connected to the battery cell is made to generate a high temperature, and the temperature may continue to increase if the short circuit continues, and fire breakout or explosion may occur in severe cases. In order to guarantee the safety of the battery, generally, the bus members may be made from a fusible material. When a current flowing through the bus member exceeds a threshold, the bus members may be fused, thus breaking electrical connection between the battery cells and avoiding continuing of the short circuit and high temperature inside the battery.

The inventor finds that when a short circuit occurs inside the battery, since fusing of the bus member needs a long time, before the bus member is completely fused, the high temperature caused by the short circuit has damaged the battery cell and the box of the battery, and even before the bus member is completely fused, the battery is on fire or exploded.

In view of this, the embodiment of the present application provides a technical solution, by arranging the plurality of fusing portions on the bus member, the minimum overcurrent cross-sectional area $S_{min}$ and the maximum overcurrent cross-sectional area $S_{max}$ of all the fusing portions satisfy certain value conditions, such that when the current flowing through the bus member exceeds the threshold, a time difference between fusing start and fusing end of all the fusing portions is small, that is, fusing time of the bus member is short, thus shortening duration of the short circuit between the battery cells, and avoiding serious safety accidents caused during fusing of the fusing portion due to a long-duration short circuit.

The technical solution described in the embodiment of the present application is applicable to a battery and a power consumption device using the battery.

The electric apparatus may be a vehicle, a mobile phone, a portable apparatus, a notebook computer, a ship, a spacecraft, an electric toy, electric tool, etc. The vehicles may be a fuel vehicle, a gas vehicle or a new energy vehicle, and the new energy vehicle may be a battery electric vehicle, a hybrid electric vehicle, an extended-range vehicle, etc. The spacecraft includes an aircraft, a rocket, a space shuttle, a spaceship, etc. The electric toy includes fixed or mobile electric toys, such as a game machine, an electric car toy, an electric boat toy and an electric airplane toy. The electric tool includes a metal cutting electric tool, a grinding electric tool, an assembling electric tool and a railway electric tool, such as an electric drill, an electric grinder, an electric wrench, an electric screwdriver, an electric hammer, an impact electric drill, a concrete vibrator and an electric planer. The embodiment of the present application does not make special restrictions on the above power consumption device.

In the following embodiments, the vehicle 1000 is taken as an example of the power consumption device for the convenience of description.

With reference to FIG. 1, FIG. 1 is a structural schematic diagram of the vehicle 1000 provided by some embodiments of the present application. A battery 100 is arranged inside the vehicle 1000, and the battery 100 may be arranged at a bottom, a head or a tail of the vehicle 1000. The battery 100 may be used for energizing the vehicle 1000, for example, the battery 100 may be used as an operating power source of the vehicle 1000. The vehicle 1000 may further include a controller 200 and a motor 300, where the controller 200 is used to control the battery 100 to energize the motor 300, for example, for starting, navigating and driving the vehicle 1000.

In some embodiments of the present application, the battery 100 may not only be used as an operating power source for the vehicle 1000, but serve as a driving power source for the vehicle 1000, replacing or partially replacing fuel or natural gas to provide driving power for the vehicle 1000.

Figure 2:
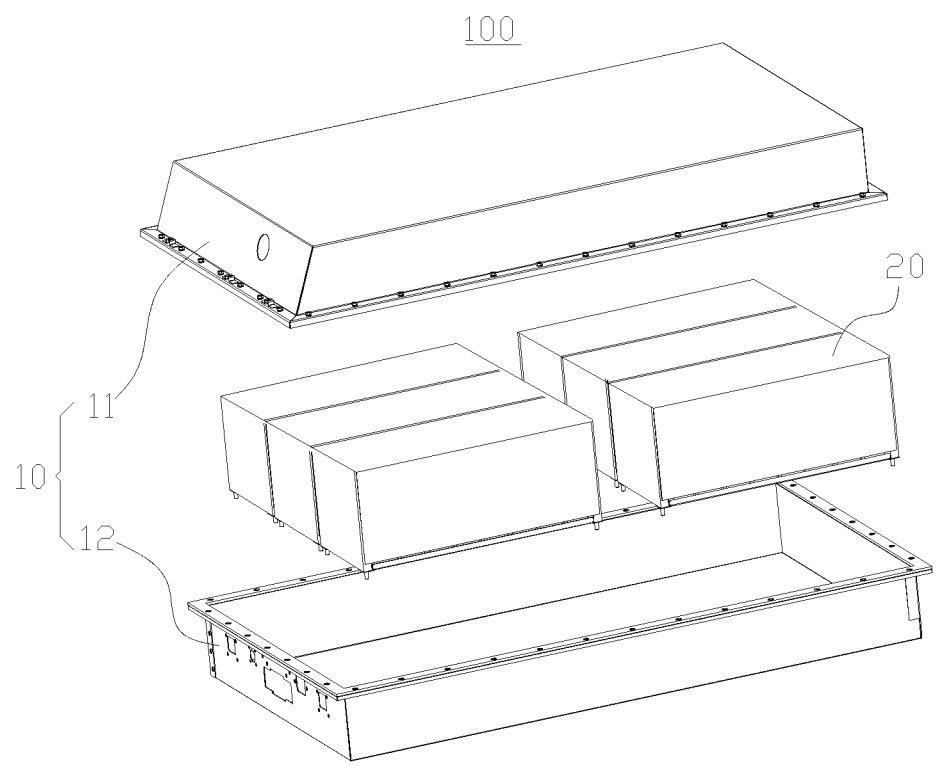
FIG. 2 is an exploded view of a battery provided by some embodiments of the present application.

With reference to FIG. 2, FIG. 2 is an exploded view of the battery provided by some embodiments of the present application. The battery 100 includes a box 10 and a battery cell 20, where the battery cell 20 is contained inside the box 10, the box 10 provides a containing space for the battery cell 20, the box 10 includes a first box portion 11 and a second box portion 12, and the first box portion 11 and the second box portion 12 are configured to jointly define the containing space for containing the battery cell 20. In the battery 100, the plurality of battery cells 20 are arranged, and the plurality of battery cells 20 may be connected to one another in series, in parallel or in a parallel-series manner, the parallel-series manner indicating that the plurality of battery cells 20 are connected in both series and parallel. The plurality of battery cells 20 may be directly connected in series, in parallel or in a parallel-series manner, and then a whole formed by the plurality of battery cells 20 is contained in the box 10. Of course, the plurality of battery cells 20 may be connected in series, in parallel or in a parallel-series manner to form a battery module firstly, and then a plurality of battery modules are connected in series, in parallel or in a parallel-series manner to form a whole to be contained in the box 10. The battery cell 20 may be a cylinder, flat, or in other shapes.

Figure 3:
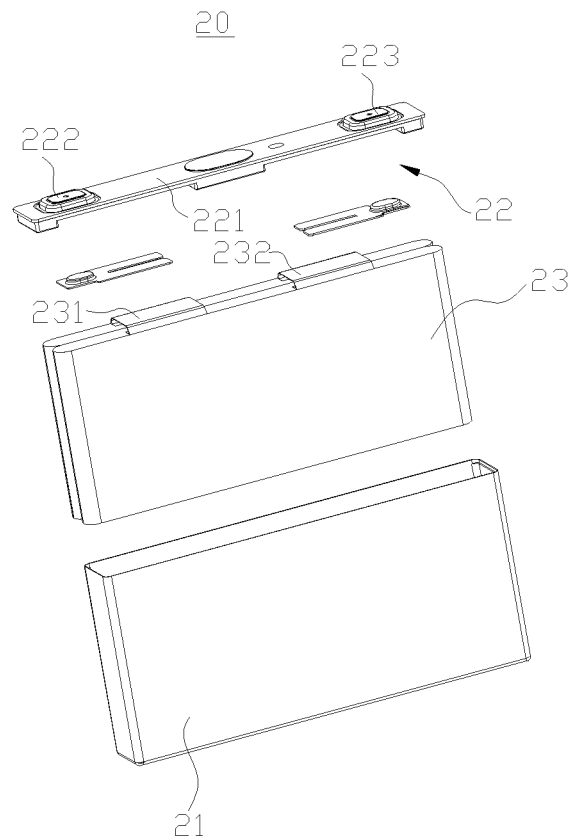
FIG. 3 is an exploded view of a battery cell provided by some embodiments of the present application.
Figure 4:
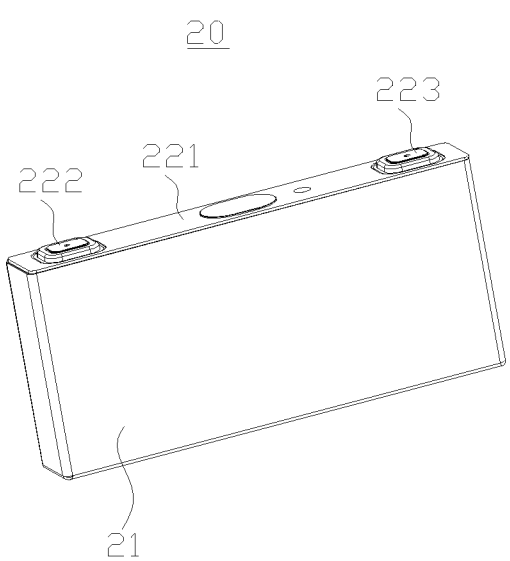
FIG. 4 is an assembly drawing of the battery cell provided by some embodiments of the present application.

As shown in FIG. 3 and FIG. 4, FIG. 3 is an exploded view of the battery cell 20 provided by some embodiments of the present application, and FIG. 4 is an assembly view of the battery cell 20 in FIG. 3. The battery cell 20 includes a case 21, an end cover assembly 22 and an electrode assembly 23, where the case 21 is provided with an opening, the electrode assembly 23 is contained in the case 21, and the end cover assembly 22 is used for covering the opening. The case 21 may be in various shapes, such as a cylinder and a flat shape. A shape of the case 21 may be determined according to a specific shape of the electrode assembly 23. For example, if the electrode assembly 23 is in a cylinder structure, the case 21 may be selected to be in a cylinder structure. If the electrode assembly 23 is in a flat structure, the case 21 may be selected to be in a cuboid structure. The case 21 may be made from various materials, such as copper, iron, aluminum, stainless steel and aluminum alloy, which is not specifically limited in the embodiment of the present application.

The end cover assembly 22 includes a cover body 221, a first electrode terminal 222 and a second electrode terminal 223, and the first electrode terminal 222 and the second electrode terminal 223 are configured to be electrically connected to a positive tab 231 and a negative tab 232 of the electrode assembly 23 respectively.

Figure 5:
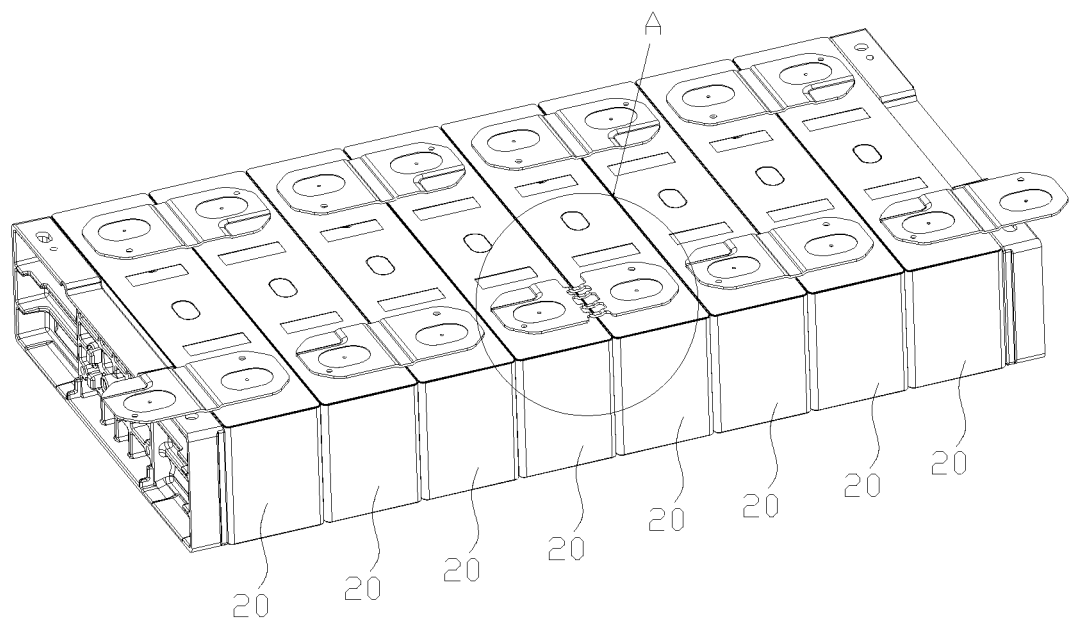
FIG. 5 is an axonometric view of a plurality of battery cells connected through a bus member provided by some embodiments of the present application.
Figure 6:
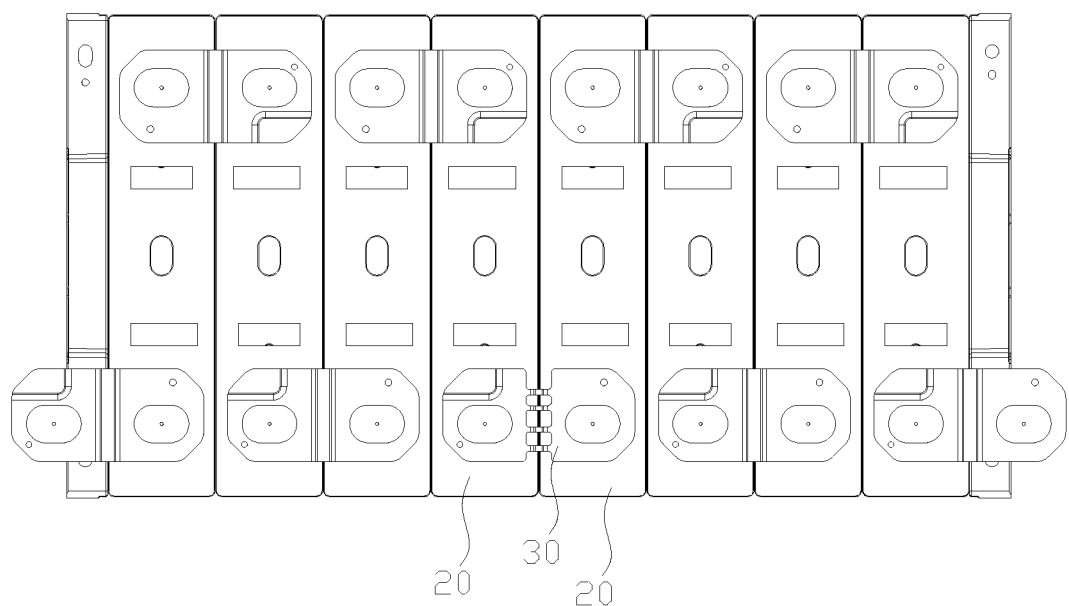
FIG. 6 is a top view of the plurality of battery cells connected through the bus member provided by some embodiments of the present application.

In some embodiments, as shown in FIG. 5 and FIG. 6, FIG. 5 shows an axonometric view of the plurality of battery cells 20 connected through a bus member 30, and FIG. 6 shows a top view of the plurality of battery cells 20 connected through the bus member 30. The battery 100 may further include the bus member 30, and the plurality of battery cells 20 may be electrically connected to one another through the bus member 30, so as to realize series connection, parallel connection or parallel-series connection of the plurality of battery cells 20. Two battery cells 20 electrically connected by the same bus member 30 are defined as a first battery cell 24 and a second battery cell 25.

Figure 7:
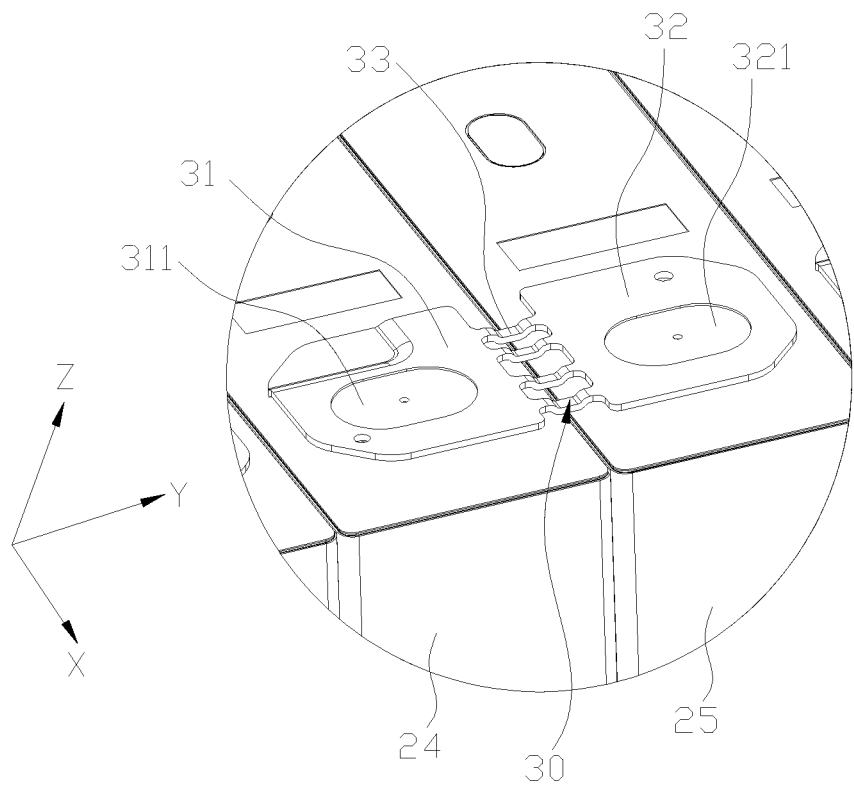
FIG. 7 is a partial enlarged view at portion A in FIG. 5.

In some embodiments, with reference to FIG. 7, FIG. 7 is a partial enlarged view at portion A in FIG. 5. The bus member 30 includes a first connection portion 31, a second connection portion 32 and a plurality of fusing portions 33. The first connection portion 31 is configured to be connected to the first electrode terminal 222 of the first battery cell 24 and the second connection portion 32 is configured to be connected to the second electrode terminal 223 of the second battery cell 25. One end of each fusing portion 33 is connected to the first connection portion 31 and the other end of each fusing portion is connected to the second connection portion 32.

The plurality of fusing portions 33 are arranged side by side in a width direction X of the bus member 30. When a current flowing through the bus member 30 is lower than the threshold, each fusing portion 33 is in a state of connecting the first connection portion 31 to the second connection portion 32, and the fusing portion 33 is configured to be fused when the current flowing through the bus member 30 exceeds the threshold, such that the first connection portion 31 is disconnected from the second connection portion 32, that is, the electrical connection between the first battery cell 24 and the second battery cell 25 breaks.

In some embodiments, an overcurrent cross-sectional area corresponding to one of the plurality of fusing portions 33 with a maximum overcurrent cross-sectional area is expressed as $S_{max}$, and an overcurrent cross-sectional area corresponding to one of the plurality of fusing portions 33 with a minimum overcurrent cross-sectional area is expressed as $S_{min}$, and $S_{min}$ and $S_{max}$ satisfy the following relational expression: $0.3 \leq S_{min}/S_{max} \leq 1$. By arranging the plurality of fusing portions 33 on the bus member 30, the minimum overcurrent cross-sectional area $S_{min}$ and the maximum overcurrent cross-sectional area $S_{max}$ of all the fusing portions 33 satisfy $0.3 \leq S_{min}/S_{max} \leq 1$, such that when the current flowing through the bus member 30 exceeds the threshold, a time difference between fusing start and fusing end of all the fusing portions 33 is small, that is, fusing time of the bus member 30 is short, thus shortening duration of short circuits of the first battery cell 24 and the second battery cell 25, avoiding accumulation of arc energy of the fusing portions 33 during fusing due to a long-duration short circuit, and reducing arc damage caused during fusing. The arc refers to a maximum capacity of a switch to cut off a current, and the arc may cause damage to an insulator, for example, a high temperature of the arc may melt or break the insulator.

In addition, the plurality of fusing portions 33 are provided, and may also enhance heat dissipation performance of the bus member 30 in an overcurrent process. When a portion of the fusing portion 33 mechanically breaks accidentally, the other unbroken fusing portion 33 may still guarantee normal operation of the bus member 30.

In some embodiments, an overcurrent cross-section of the fusing portion 33 is in the form of a variable cross-section, that is, the overcurrent cross-sectional areas of some or all positions of the fusing portion 33 are different in a direction Y from the first connection portion to the second connection portion, and a fused position of the fusing portion 33 should be a position with a minimum overcurrent cross-sectional area, so the overcurrent cross-sectional area of the fusing portion 33 refers to a minimum overcurrent cross-sectional area thereof. $S_{min}$ is not only the minimum overcurrent cross-sectional area of the corresponding fusing portion 33, but a minimum in the minimum overcurrent cross-sectional areas of all the fusing portions 33. $S_{max}$ is the minimum overcurrent cross-sectional area of the corresponding fusing portion 33, but is a maximum in the minimum overcurrent cross-sectional areas of all the fusing portions 33.

Exemplarily, S1, S2, S3 and S4 are the minimum overcurrent cross-sectional areas of the corresponding four fusing portions 33, where S1>S2>S3>S4, then $S_{min}$=S4 and $S_{max}$=S1.

In some embodiments, the overcurrent cross-section of the fusing portion 33 is in the form of an equal cross-section, that is, in the direction Y from the first connection portion to the second connection portion of the fusing portion 33, the overcurrent cross-sectional areas at positions are equal. $S_{min}$ is the minimum overcurrent cross-sectional area of all the fusing portions 33. $S_{max}$ is the maximum overcurrent cross-sectional area of all the fusing portions 33.

Exemplarily, S1, S2, S3 and S4 are the overcurrent cross-sectional areas of the corresponding four fusing portions 33, where S1>S2>S3>S4, then $S_{min}$=S4 and $S_{max}$=S1.

In some embodiments, $S_{min}$ and $S_{max}$ satisfy the following relational expression: $0.8 \leq S_{min}/S_{max} < 1$. The smallest fusing time difference is achieved when the ratio of $S_{min}/S_{max}$ falls within 0.8-1, which may further shorten the time difference between the fusing start and the fusing end of all the fusing portions 33, that is, shorten the fusing time of the bus member 30, thus further shortening duration of short circuits, instantly fusing the bus member 30 and cutting off a whole circuit upon the short circuit, effectively avoiding accumulation of arc energy of the fusing portions 33 during fusing due to a long-duration short circuit, reducing arc damage caused during fusing, and avoiding over-temperature or thermal runaway when the battery is short-circuited for a long time.

In some embodiments, overcurrent cross-sectional areas of at least two fusing portions 33 in the plurality of fusing portions 33 are unequal. Under the condition that the sum of the overcurrent cross-sectional areas of all the fusing portions 33 is fixed, the overcurrent cross-sectional areas of the at least two fusing portions 33 are unequal, such that the minimum fusing time difference of the bus member 30 is achieved, the fusing time of the bus member 30 is further optimized, and the first battery cell 24 and the second battery cell 25 may be prevented from being short-circuited for a long time.

In some embodiments, the overcurrent cross-sectional areas of the fusing portions 33 may be equal or the overcurrent cross-sectional areas of the fusing portions 33 may be unequal to one another.

To verify whether the above numerical range may reduce the fusing time difference of the plurality of fusing portions 33 in the bus member 30, and therefore make the fusing time difference less than 50 ms. Generally, the fusing time being 50 ms or within of the bus member 30 may effectively prevent firing or explosion. The following performs a test on a bus member 30 with three fusing portions 33.

Test 1: the sum of the overcurrent cross-sectional areas $S_{total}$ of the plurality of fusing portions 33 of the bus member 30 is 18 mm$^2$, and the three fusing portions 33 are included. A test process includes: an overcurrent protection structure, a relay switch and a direct current (DC) resistor are connected in series to a DC high voltage circuit, and the DC resistor with a specific resistance is selected according to a total voltage of the circuit, a total current when the control circuit is closed being 8,000 A, the relay switch is closed, and a current change in the closed circuit is monitored. A time point when the current in the circuit fluctuates is a start point t1 when the fusing portions 33 of the bus member 30 are fused, a time point when the current in the circuit completely drops to 0 A is an end point t2 when all the fusing portions 33 are fused, and a difference t2-t1 between the two time points is the time difference Δt of the plurality of fusing portions 33. Parameters and test results of each fusing portion 33 are shown in Table 1.

TABLE 1

Parameters and test results of the fusing portion 33

| Number of fusing portions 33 | Distribution of overcurrent cross-sectional areas of the fusing portions 33/mm² | | | $S_{min}/S_{max}$ | Start point t1/ms | Fusing end point t2/ms | Fusing time difference Δt/ms |
|---|---|---|---|---|---|---|---|
| 3 | 1.0 | 7.0 | 10 | 0.1 | 81.3 | 148.9 | 67.6 |
|   | 2.0 | 6.0 | 10 | 0.2 | 94.9 | 151.9 | 57.4 |
|   | 3.0 | 5.0 | 10 | 0.3 | 105.9 | 153.3 | 47.4 |
|   | 4.0 | 4.0 | 10 | 0.4 | 114.3 | 150.7 | 36.4 |
|   | 4.0 | 6.0 | 8.0 | 0.5 | 118.2 | 149.8 | 31.6 |
|   | 4.8 | 5.2 | 8.0 | 0.6 | 124.6 | 149.9 | 25.3 |
|   | 5.0 | 5.9 | 7.1 | 0.7 | 127.4 | 147.2 | 19.8 |
|   | 5.4 | 5.8 | 6.8 | 0.8 | 130.4 | 146.1 | 15.7 |
|   | 5.7 | 6.0 | 6.3 | 0.9 | 135.1 | 142.6 | 7.5 |
|   | 6.0 | 6.0 | 6.0 | 1.0 | 133.0 | 144.1 | 11.1 |

According to the above test results, $0.3 \leq S_{min}/S_{max} \leq 1$, and Δt<50 ms meet the requirement for the fusing time difference of the plurality of fusing portions 33 of the bus member 30 to guarantee the safety of battery 100 in general.

In addition, when $0.8 \leq S_{min}/S_{max} < 0.9$, the fusing time difference Δt gradually decreases, and when $0.9 < S_{min}/S_{max} < 1$, Δt gradually increases, therefore, the fusing time difference in section $0.8 \leq S_{min}/S_{max} < 1$ is smaller than that in other sections, and a minimum fusing time difference exists in section $0.8 \leq S_{min}/S_{max} < 1$.

Since the minimum fusing time difference exists in the range of $0.8 \leq S_{min}/S_{max} < 1$, the overcurrent cross-sectional areas of all the three fusing portions 33 are unequal to one another or the overcurrent cross-sectional areas of at least two fusing portions 33 are unequal.

Therefore, when $0.3 \leq S_{min}/S_{max} \leq 1$, the fusing time difference of the plurality of fusing portions 33 of the bus member 30 may be shortened, and the fusing time difference is kept within the range that may guarantee the safety of the battery 100, that is, the fusing time difference is kept at 50 ms or within.

fusing time of the bus member 30 may be further optimized, and the first battery cell 24 and the second battery cell 25 may be prevented from being short-circuited for a long time.

Exemplarily, when the three fusing portions 33 are arranged, and the overcurrent cross-sectional areas of the three fusing portions 33 are S1, S2 and S3 separately, then $S_{total} = S1 + S2 + S3$.

Generally, when the fusing time difference is shorter than 40 ms, minimal damage to the battery 100 is achieved, and loss of the battery 100 may be reduced. In order to obtain a shorter fusing time difference, and make the fusing time difference shorter than 40 ms, on the basis of test 1, test 2 is performed as follows:

The fusing test is performed on the bus member 30 of preferred design, that is, the second test is conducted under the condition that $0.3 \leq S_{min}/S_{max} \leq 1$ is satisfied. Test flows and related parameters are consistent with those of test 1. By monitoring a current change in a closed circuit, a fusing start point t1, a fusing end point t2 and a fusing time difference Δt are extracted. Parameters and test results of each fusing portion 33 are shown in Table 2.

TABLE 2

Parameters and test results of the fusing portion 33

| Number of fusing portions 33 | Distribution of overcurrent cross-sectional areas of the fusing portions 33/mm² | | | $S_{min}/S_{max}$ | $S_{min}/S_{total}$ | $S_{max}/S_{total}$ | Start point t1/ms | Fusing end point t2/ms | Fusing time difference Δt/ms |
|---|---|---|---|---|---|---|---|---|---|
| 3 | 3.0 | 5.0 | 10 | 0.30 | 0.17 | 0.56 | 105.9 | 153.3 | 47.4 |
|   | 3.2 | 4.2 | 10.6 | 0.30 | 0.18 | 0.59 | 108.2 | 154.3 | 46.1 |
|   | 3.4 | 3.4 | 11.2 | 0.30 | 0.19 | 0.62 | 109.2 | 154.5 | 45.3 |
|   | 3.6 | 3.6 | 10.8 | 0.33 | 0.20 | 0.60 | 113.2 | 152.5 | 39.3 |
|   | 3.6 | 3.7 | 10.7 | 0.34 | 0.20 | 0.59 | 113.0 | 152.1 | 39.1 |
|   | 3.8 | 4.0 | 10.2 | 0.37 | 0.21 | 0.57 | 113.3 | 151.9 | 38.6 |
|   | 4.0 | 4.0 | 10 | 0.4 | 0.22 | 0.56 | 114.3 | 150.7 | 36.4 |
|   | 4.0 | 6.0 | 8.0 | 0.5 | 0.22 | 0.44 | 118.2 | 149.8 | 31.6 |

In some embodiments, the sum of the overcurrent cross-sectional areas of the fusing portions 33 is expressed as $S_{total}$, where $S_{min}$ and $S_{total}$ satisfy the following relational expression: $0.2 \leq S_{min}/S_{max}$, and $S_{total}$ satisfy the following relational expression: $S_{max}/S_{total} < 0.6$, by limiting the ratio between the minimum overcurrent area $S_{min}$ and the sum of the overcurrent cross-sectional areas $S_{total}$ of all the fusing portions 33 to be greater than or equal to 0.2 and the ratio between the maximum overcurrent cross-sectional area $S_{max}$ and the sum of the overcurrent cross-sectional areas $S_{total}$ of all the fusing portions 33 to be less than or equal to 0.6, the According to the above test results, when $S_{min}/S_{total} \geq 0.2$ and $S_{max}/S_{total} \leq 0.6$, the fusing time difference may be controlled to be 40 ms or within.

Though verification of the above test, the technical solution of the present application may control the fusing time difference of the bus member 30 within a safe range.

Since the bus member 30 is stamp formed, in some embodiments, the overcurrent cross-sectional area of the fusing portion 33 is 1.5 times greater than the thickness thereof for enhancing manufacturability of the bus member 30. A thickness direction Z is perpendicular to the width direction X and the direction Y from the first connection portion to the second connection portion.

It should be noted that comparison between the overcurrent cross-sectional area and the thickness of the fusing portion 33 refers to the numerical comparison between the overcurrent cross-sectional area and the thickness.

With continuous reference to FIG. 7, the first connection portion 31 is provided with a first recess 311, the first recess 311 corresponds to a connection position, connected to the first electrode terminal 222, of the first connection portion 31. After the first connection portion 31 is connected to the first electrode terminal 222, a projection, in the thickness direction Z, of the first recess 311 at least partially coincides with a projection, in the thickness direction Z, of the first electrode terminal 222. The first recess 311 is recessed in a direction close to the first electrode terminal 222. Since the bus member 30 and the first electrode terminal 222 are generally welded together, a thickness of a corresponding position of the first connection portion 31 is smaller than that of other positions due to arrangement of the first recess 311, facilitating laser welding.

The second connection portion 32 is provided with a second recess 321, the second recess 321 corresponds to a connection position, connected to the second electrode terminal 223, of the second connection portion 32. After the second connection portion 32 is connected to the second electrode terminal 223, a projection, in the thickness direction Z, of the second recess 321 at least partially coincides with a projection, in the thickness direction Z, of the second electrode terminal 223. The second recess 321 is recessed in a direction close to the second electrode terminal 223. Since the bus member 30 and the second electrode terminal 223 are generally welded together, a thickness of a corresponding position of the second connection portion 32 is smaller than that of other positions due to arrangement of the second recess 321, facilitating laser welding.

In the embodiment of the present application, the number of the fusing portions 33 may be two, three or more.

In some embodiments, at least three (three or more) fusing portions 33 are arranged, the at least three fusing portions 33 are arranged side by side in the width direction X of the bus member 30, and the overcurrent cross-sectional areas of the at least three fusing portions 33 are sequentially reduced from two sides to a middle of the bus member 30 in the width direction X. The two sides, in the width direction X, of the bus member 30, subjected to external force, bear relatively-large torque, so the overcurrent cross-sectional areas of the fusing portions 33 are sequentially reduced from the two sides to the middle of the bus member 30 in the width direction X, that is, the overcurrent cross-sectional areas of the fusing portions 33 located on the two sides in the width direction X are greater than those of the fusing portions 33 located in the middle, mechanical strength of the bus member 30 is enhanced, and the two sides of the bus member 30 in the width direction X may bear the relatively-large torque.

Figure 8:
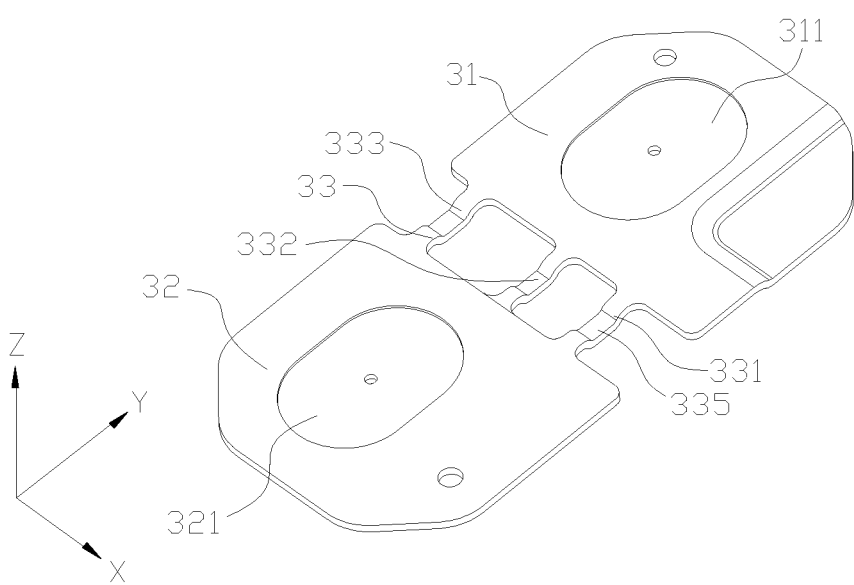
FIG. 8 is a structural schematic diagram of a bus member with three fusing portions provided by some embodiments of the present application.

With reference to FIG. 8, FIG. 8 is a structural schematic diagram of a bus member 30 with three fusing portions 33 provided by some embodiments of the present application. The three fusing portions 33 are arranged, and include a first fusing portion 331, a second fusing portion 332 and a third fusing portion 333 in sequence in the width direction X. An overcurrent cross-sectional area of the first fusing portion 331 and an overcurrent cross-sectional area of the third fusing portion 333 are both greater than that of the second fusing portion 332. The overcurrent cross-sectional area of the first fusing portion 331 and the overcurrent cross-sectional area of the third fusing portion 333 may be the equal or unequal.

Figure 9:
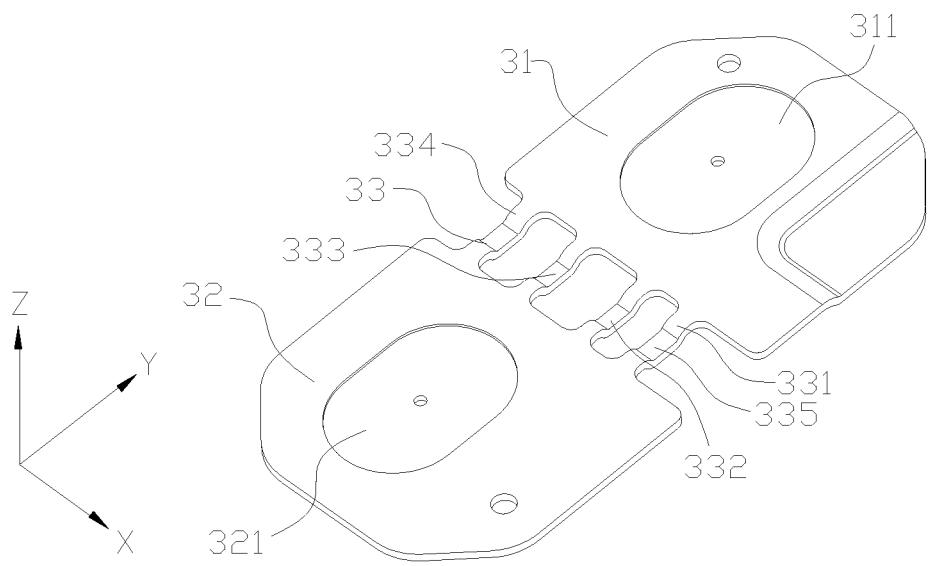
FIG. 9 is a structural schematic diagram of a bus member with four fusing portions provided by some embodiments of the present application.

In some embodiments, FIG. 9 is a structural schematic diagram of a bus member 30 with four fusing portions 33 provided by some embodiments of the present application. The four fusing portions 33 are arranged, and include a first fusing portion 331, a second fusing portion 332, a third fusing portion 333 and a fourth fusing portion 334 in sequence in the width direction X. An overcurrent cross-sectional area of the first fusing portion 331 is greater than that of the second fusing portion 332, and an overcurrent cross-sectional area of the fourth fusing portion 334 is greater than that of the third fusing portion 333. The overcurrent cross-sectional area of the first fusing portion 331 and the overcurrent cross-sectional area of the fourth fusing portion 334 may be the equal or unequal. The overcurrent cross-sectional area of the second fusing portion 332 and the overcurrent cross-sectional area of the third fusing portion 333 may be the equal or unequal.

In some embodiments, at least one fusing portion 33 is provided with a bent portion 335, the bent portion 335 is configured to absorb stress in the width direction X of the bus member 30. The bent portion 335 arranged may absorb the stress in the width direction X of the bus member 30, and play a certain role in protecting the bus member 30 and the battery cell 20.

In some embodiments, with continuous reference to FIG. 9, all the fusing portions 33 are provided with bent portions 335. One side, close to the first battery cell 24 and the second battery cell 25, of the bent portion 335 is bent, which may prevent the phenomenon that the fusing portion 33 is squeezed during manufacturing of the battery 100 and assembly of the battery 100, resulting in mechanical breakage, and may reduce hazards of an over-current temperature and fusing of the fusing portion 33 to the box 10 of the battery 100.

Figure 10:
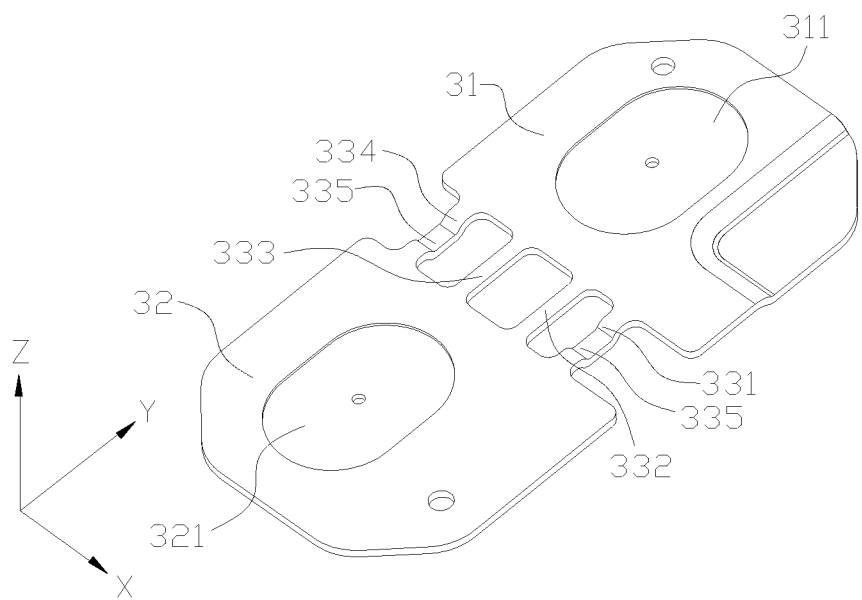
FIG. 10 is a structural schematic diagram of a bus member with partial fusing portions provided with bent portions provided by some embodiments of the present application.

In some embodiments, with reference to FIG. 10, FIG. 10 is a structural schematic diagram of a bus member with partial fusing portions 33 provided with bent portions 335 provided by some embodiments of the present application. For the bus member 30, partial fusing portions 33 may be provided with bent portions 335, and the other fusing portions 33 are in a structure of linear extending. In FIG. 10, the second fusing portion 332 and the third fusing portion 333 are in a structure of linear extending, and the first fusing portion 331 and the fourth fusing portion 334 are provided with bent portions 335.

Figure 11:
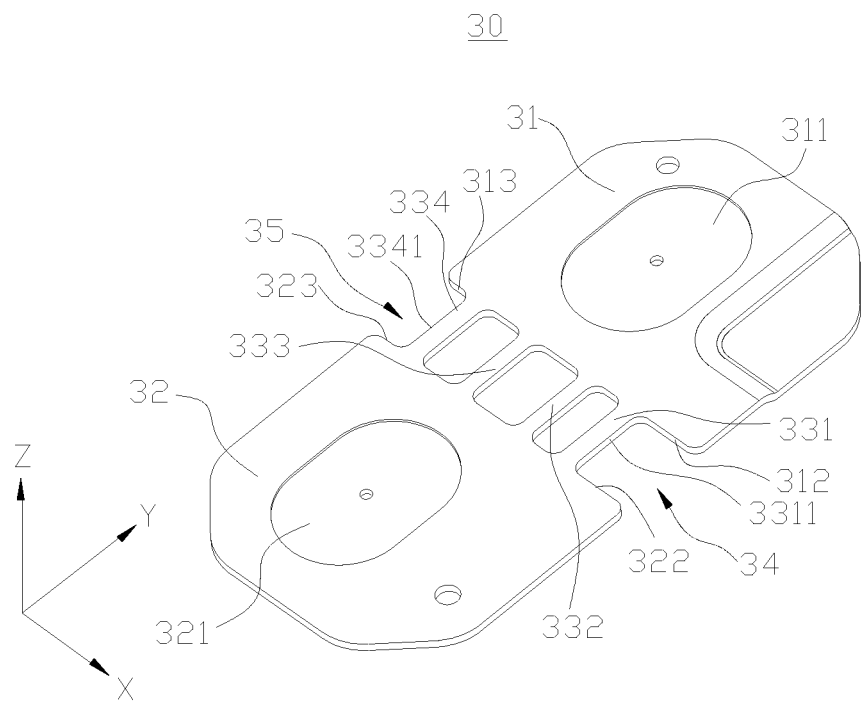
FIG. 11 is a structural schematic diagram of a bus member with a fusing portion provided without a bent portion provided by some embodiments of the present application.

In some embodiments, with reference to FIG. 11, FIG. 11 is a structural schematic diagram of a bus member with a fusing portion 33 not provided with a bent portion 335 provided by some embodiments of the present application. Each fusing portion 33 may not be provided with a bent portion 335, and all the fusing portions 33 are in a structure of linear extending.

In some embodiments of the first aspect, a gap is formed among at least one side, in the width direction X of the bus member 30, of the plurality of fusing portions 33, the first connection portion 31 and the second connection portion 32. The gap may not only make room for other structures, also make the fusing portion 33 far away from the box 10 of the battery 100 or an adjacent structure thereof, so as to prevent a high temperature generated during fusing of the fusing portion 33 from damaging the box 10 or the adjacent structure thereof.

In some embodiments, with continuous reference to FIG. 11, gaps are formed among two sides, in the width direction X of the bus member 30, of the plurality of fusing portions 33, the first connection portion 31 and the second connection portion 32. A first surface 3311, away from the second fusing portion 332, of the first fusing portion 331, a second surface 312, facing the second connection portion 32, of the first connection portion 31 and a third surface 322, facing the first connection portion 31, of the second connection portion 32 jointly define a first gap 34. A fourth surface 3341, away from the third fusing portion 333, of the fourth fusing portion 334, a fifth surface 313, facing the second connection portion 32, of the first connection portion 31 and a sixth surface 323, facing the first connection portion 31, of the second connection portion 32 jointly define a second gap 35.

In some embodiments, the first gap 34 and the second gap 35 have different depths in the width direction X of the bus member 30. Both the first gap 34 and the second gap 35 may make room for other structures inside the battery 100, and the gap which is deeper in the width direction X may make the fusing portion 33 far away from other structures, thus preventing the high temperature generated during fusing of the fusing portion 33 from damaging other structures.

Figure 12:
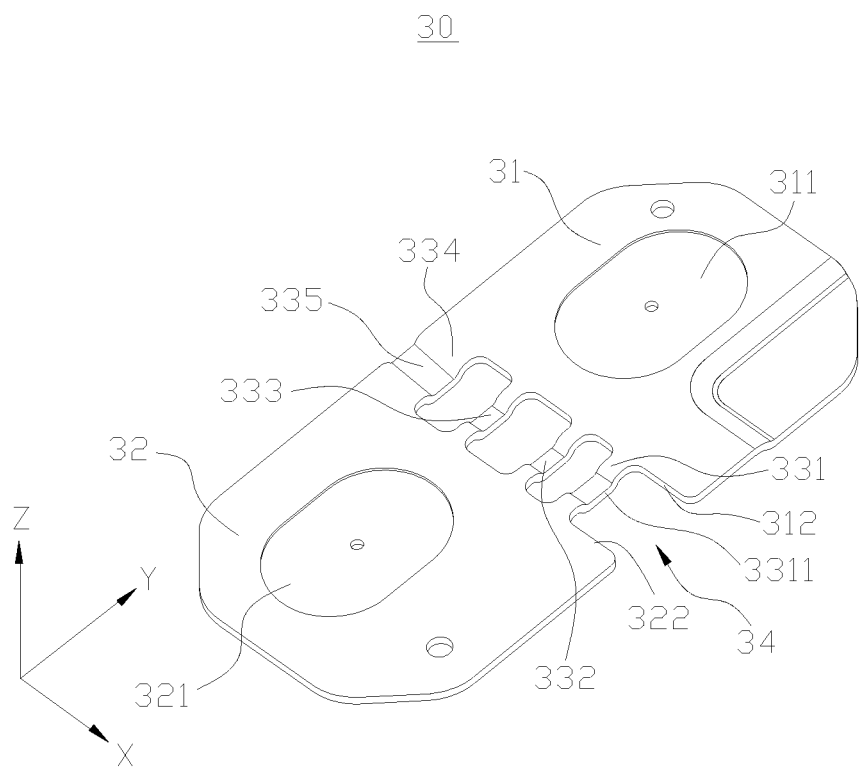
FIG. 12 is a structural schematic diagram of a bus member with a gap formed on one side in a width direction provided by some embodiments of the present application.

In some embodiments, with reference to FIG. 12, FIG. 12 is a structural schematic diagram of a bus member 30 with a gap formed on one side in the width direction X provided by the embodiment of the present application. The gaps are formed among one sides, in the width direction X of the bus member 30, of the plurality of fusing portions 33, the first connection portion 31 and the second connection portion 32, and the first surface 3311, away from the second fusing portion 332, of the first fusing portion 331, the second surface 312, facing the second connection portion 32, of the first connection portion 31 and the third surface 322, facing the first connection portion 31, of the second connection portion 32 jointly define the first gap 34.

Figure 13:
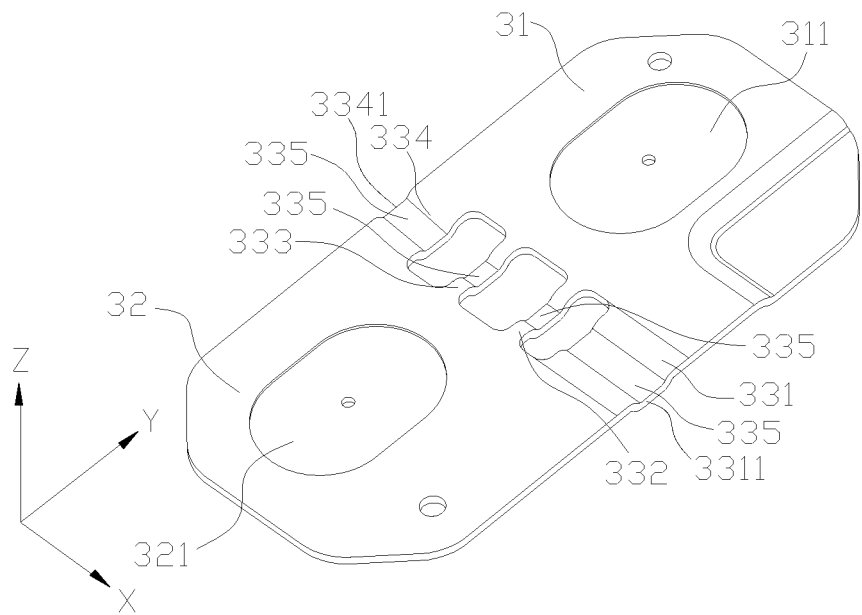
FIG. 13 is a structural schematic diagram of a bus member without a gap provided by some embodiments of the present application.

In some embodiments, with reference to FIG. 13, FIG. 13 is a structural schematic diagram of a bus member 30 without a gap provided by some embodiments of the present application. No gaps are formed among two sides, in the width direction X of the bus member 30, of the plurality of fusing portions 33, the first connection portion 31 and the second connection portion 32. In FIG. 13, the first surface 3311, away from the second fusing portion 332, of the first fusing portion 331, a surface, in the width direction X, of the first connection portion 31 and a surface, in the width direction X, of the second connection portion 32 are coplanar, and the fourth surface 3341, away from the third fusing portion 333, of the fourth fusing portion 334, the other surface, in the width direction X, of the first connection portion 31 and the other surface, in the width direction X, of the second connection portion 32 are coplanar.

Figure 14:
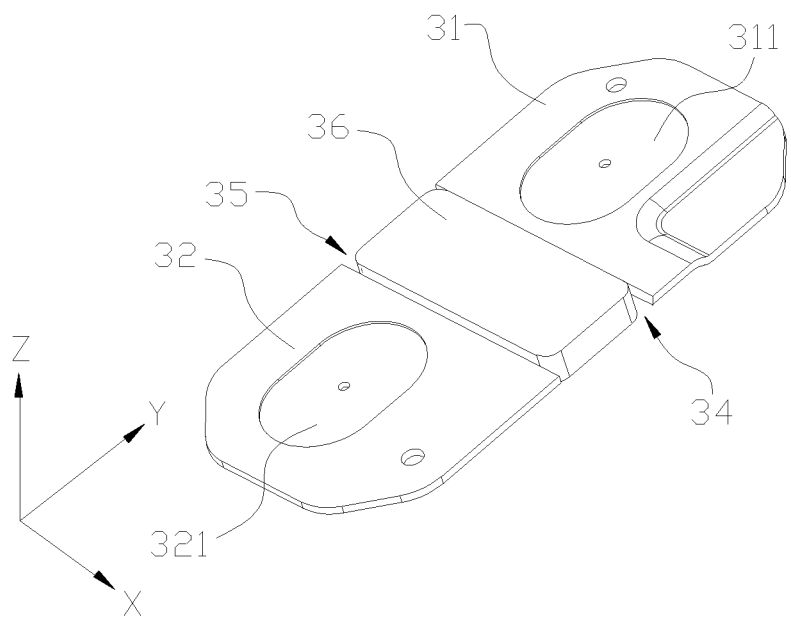
FIG. 14 is a structural schematic diagram of a bus member with a protective cover provided by some embodiments of the present application.

In some embodiments, with reference to FIG. 14, FIG. 14 is a structural schematic diagram of a bus member 30 with a protective cover 36 provided by some embodiments of the present application. The bus member 30 further includes a protective cover 36, the protective cover 36 being configured to cover the plurality of fusing portions 33, so as to protect the plurality of fusing portions 33. The protective cover 36 may not only protect the fusing portion 33 and avoid mechanical breakage of the fusing portion 33 caused by deformation of the box 10, change of a distance between the first battery cell 24 and the second battery cell 25, etc., but reduce damage of the high temperature generated during fusing of the fusing portion 33 to the box 10, the first battery cell 24 and the second battery cell 25, so as to reduce arc hazards caused by fusing. The protective cover 36 may also enhance structural strength of the bus member 30.

The protective cover 36 may have a sleeve-like structure, and is directly sleeved on peripheries of the plurality of fusing portions 33 to be wrapped around the plurality of fusing portions 33. The protective cover 36 may be in a belt structure alternatively, to be wound around the peripheries of the plurality of fusing portions 33, to be wrapped around the plurality of fusing portions 33.

The first connection portion 31 and the second connection portion 32 separately extend out of the protective cover 36, so as to facilitate connection of the bus member 30 to the first electrode terminal 222 of the first battery cell 24 and the second electrode terminal 223 of the second battery cell 25.

In some embodiments, the protective cover 36 may be wrapped around the first connection portion 31 and the second connection portion 32, so as to protect the first connection portion 31 and the second connection portion 32.

In some embodiments, the protective cover 36 is partially located in the gap formed among the fusing portion 33, the first connection portion 31 and the second connection portion 32. With reference to FIG. 14, two sides, in the width direction X, of the protective cover are located at the first gap 34 and the second gap 35 correspondingly, such that a size of the protective cover 36 in the width direction X of the bus member 30 is relatively small, thereby occupying less space inside the battery 100.

The protective cover 36 is made from PP, perfluoroalkoxy (PFA) or ceramic.

Figure 15:
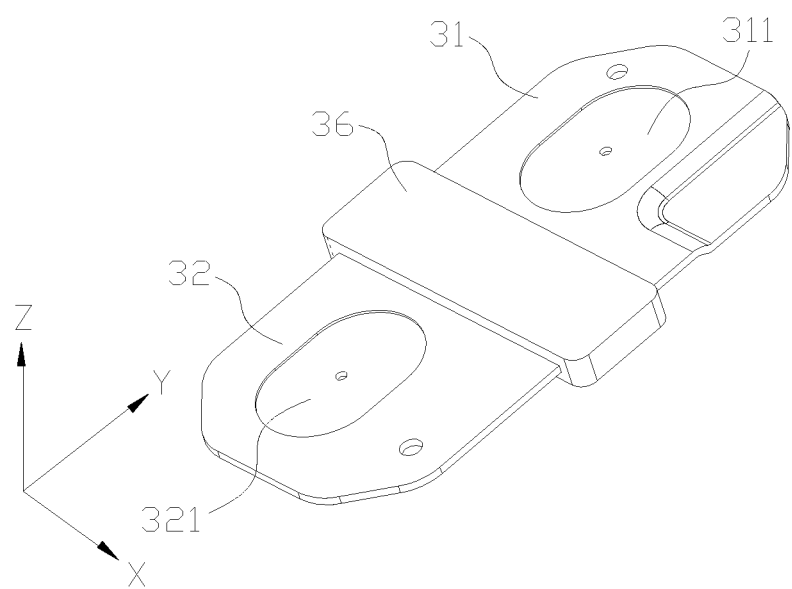
FIG. 15 is a structural schematic diagram of a bus member with a protective cover provided by still some embodiments of the present application.

In some embodiments, with reference to FIG. 15, FIG. 15 is a schematic structural diagram of a bus member 30 with a protective cover 36 provided by still some embodiments of the present application. When no gaps are formed among two sides, in the width direction X, of the plurality of fusing portions 33, the first connection portion 31 and the second connection portion 32, the two sides, in the width direction X, of the protective cover 36 completely protrude from the first connection portion 31 and the second connection portion 32.

Although the present application has been described with reference to preferred embodiments, various modifications may be made and equivalents may be substituted for parts thereof without departing from the scope of the present application. Especially, as long as there is no structural conflict, the technical features mentioned in the embodiments may be combined in any way. The present application is not limited to the specific embodiments disclosed herein, but includes all technical solutions falling within the scope of the claims.

What is claimed is:

1. A bus member, comprising:
   a first connection portion configured to be connected to a first electrode terminal of a first battery cell;
   a second connection portion configured to be connected to a second electrode terminal of a second battery cell;
   a plurality of fusing portions, one end of each fusing portion being connected to the first connection portion, and the other end of each fusing portion being connected to the second connection portion;
   wherein an overcurrent cross-sectional area corresponding to one of the plurality of fusing portions with a maximum overcurrent cross-sectional area is expressed as $S_{max}$, and an overcurrent cross-sectional area corresponding to one of the plurality of fusing portions with a minimum overcurrent cross-sectional area is expressed as $S_{min}$, and $S_{min}$ and $S_{max}$ satisfy the following relational expression:

$$0.3 \leq S_{min}/S_{max} \leq 1;$$

wherein there are at least three fusing portions; and
the at least three fusing portions are arranged side by side in a width direction of the bus member, and the overcurrent cross-sectional areas of the at least three fusing portions are sequentially reduced from two sides to a middle of the bus member in the width direction.

2. The bus member according to claim 1, wherein $S_{min}$ and $S_{max}$ satisfy the following relational expression:

$0.8 \leq S_{min}/S_{max} < 1$.

3. The bus member according to claim 1, wherein the sum of the overcurrent cross-sectional areas of the plurality of fusing portions is expressed as $S_{total}$, wherein $S_{min}$ and $S_{total}$ satisfy the following relational expression:

$0.2 \leq S_{min}/S_{total}$; and $S_{max}$ and $S_{total}$ satisfy the following relational expression:

$S_{min}/S_{total} \leq 0.6$.

4. The bus member according to claim 1, wherein the overcurrent cross-sectional areas of at least two fusing portions in the plurality of fusing portions are unequal.

5. The bus member according to claim 1, wherein the overcurrent cross-sectional area of the fusing portion is 1.5 times greater than a thickness of the fusing portion.

6. The bus member according to claim 1, wherein at least one of the fusing portions is provided with a bent portion, the bent portion being configured to absorb stress in the width direction of the bus member.

7. The bus member according to claim 1, wherein a gap is formed among at least one side, in the width direction of the bus member, of the plurality of fusing portions, the first connection portion and the second connection portion.

8. The bus member according to claim 7, wherein a first gap is formed among one side in the width direction of the bus member, the first connection portion and the second connection portion, and a second gap is formed among the other side in the width direction of the bus member, the first connection portion and the second connection portion; and
the first gap and the second gap have different depths in the width direction of the bus member.

9. The bus member according to claim 1, wherein the bus member further comprises a protective cover, the protective cover being configured to cover the plurality of fusing portions, so as to protect the plurality of fusing portions.

10. The bus member according to claim 1, wherein the overcurrent cross-section of the fusing portion is in the form of a variable cross-section.

11. The bus member according to claim 1, wherein the overcurrent cross-section of the fusing portion is in the form of an equal cross-section.

12. The bus member according to claim 1, wherein the overcurrent cross-sectional areas of the fusing portions may be equal or the overcurrent cross-sectional areas of the fusing portions may be unequal to one another.

13. A battery, comprising:
a first battery cell having a first electrode terminal;
a second battery cell having a second electrode terminal; and
a bus member, comprising:
a first connection portion configured to be connected to a first electrode terminal of the first battery cell;
a second connection portion configured to be connected to a second electrode terminal of the second battery cell;
a plurality of fusing portions, one end of each fusing portion being connected to the first connection portion, and the other end of each fusing portion being connected to the second connection portion;
wherein an overcurrent cross-sectional area corresponding to one of the plurality of fusing portions with a maximum overcurrent cross-sectional area is expressed as $S_{max}$, and an overcurrent cross-sectional area corresponding to one of the plurality of fusing portions with a minimum overcurrent cross-sectional area is expressed as $S_{min}$, and $S_{min}$ and $S_{max}$ satisfy the following relational expression:

$0.3 \leq S_{min}/S_{max} \leq 1$;

wherein there are at least three fusing portions; and
the at least three fusing portions are arranged side by side in a width direction of the bus member, and the overcurrent cross-sectional areas of the at least three fusing portions are sequentially reduced from two sides to a middle of the bus member in the width direction.

14. The battery according to claim 13, wherein $S_{min}$ and $S_{max}$ satisfy the following relational expression:

$0.8 \leq S_{min}/S_{max} < 1$.

15. The battery according to claim 13, wherein the sum of the overcurrent cross-sectional areas of the plurality of fusing portions is expressed as $S_{total}$, wherein $S_{min}$ and $S_{total}$ satisfy the following relational expression:

$0.2 \leq S_{min}/S_{total}$; and $S_{max}$ and $S_{total}$ satisfy the following relational expression:

$S_{min}/S_{total} \leq 0.6$.

16. The battery according to claim 13, wherein the overcurrent cross-sectional areas of at least two fusing portions in the plurality of fusing portions are unequal.

17. The battery according to claim 13, wherein the overcurrent cross-sectional area of the fusing portion is 1.5 times greater than a thickness of the fusing portion.

18. A power consumption device, comprising the battery according to claim 13, wherein the battery is configured to provide electrical energy.

* * * * *